(12) United States Patent
Sakai

(10) Patent No.: US 11,236,793 B2
(45) Date of Patent: Feb. 1, 2022

(54) DISC SPRING

(71) Applicant: NHK SPRING Co., Ltd., Yokohama (JP)

(72) Inventor: Hideaki Sakai, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 114 days.

(21) Appl. No.: 16/491,754

(22) PCT Filed: Mar. 8, 2018

(86) PCT No.: PCT/JP2018/008963
§ 371 (c)(1),
(2) Date: Sep. 6, 2019

(87) PCT Pub. No.: WO2018/164222
PCT Pub. Date: Feb. 9, 2018

(65) Prior Publication Data
US 2021/0131515 A1    May 6, 2021

(30) Foreign Application Priority Data
Mar. 8, 2017   (JP) .............................. JP2017-044380

(51) Int. Cl.
*F16F 1/32*     (2006.01)
*F16D 13/58*    (2006.01)
*F16D 127/02*   (2012.01)

(52) U.S. Cl.
CPC ............ *F16F 1/324* (2013.01); *F16D 13/583* (2013.01); *F16D 2127/02* (2013.01);
(Continued)

(58) Field of Classification Search
CPC ............... F16D 13/583; F16D 2127/02; F16D 2200/0004; F16F 1/324; F16F 2224/0208; F16F 2232/02; F16F 2232/08; F16F 1/32
(Continued)

(56) References Cited

U.S. PATENT DOCUMENTS 3,237,739 A     3/1966  Pritchard
4,538,716 A *   9/1985  Reik ..................... F16D 13/583
                                                   192/48.8
(Continued)

FOREIGN PATENT DOCUMENTS

EP    1388679 A1    2/2004
GB    2011017 A     7/1979
(Continued)

OTHER PUBLICATIONS

CNIPA First Office Action for corresponding CN Application No. 201880015960.1, dated Jul. 28, 2020.
(Continued)

*Primary Examiner* — Thomas W Irvin
(74) *Attorney, Agent, or Firm* — Cantor Colburn LLP

(57) ABSTRACT

The disc spring is a disc spring for being fitted on a rotary shaft and includes: an annular body portion; a claw portion protruding inward in a radial direction from an inner peripheral edge of the body portion, wherein the claw portion gradually extends toward one side in an axial direction as it goes inward in the radial direction, and at least a tip part of the claw portion is provided with a hole.

4 Claims, 4 Drawing Sheets

(52) U.S. Cl.
CPC .............. *F16D 2200/0004* (2013.01); *F16F 2224/0208* (2013.01); *F16F 2232/02* (2013.01); *F16F 2232/08* (2013.01)

(58) Field of Classification Search
USPC ...................................................... 267/161
See application file for complete search history.

(56) References Cited

U.S. PATENT DOCUMENTS

| | | | | |
|---|---|---|---|---|
| 4,541,514 | A * | 9/1985 | Reik .................. | F16D 13/583 192/70.27 |
| 4,704,041 | A * | 11/1987 | Hayashi ................ | F16F 1/324 101/93.05 |
| 4,747,586 | A * | 5/1988 | Reik .................. | F16D 13/583 267/161 |
| 4,985,973 | A * | 1/1991 | Yoshimura .............. | F16F 1/324 192/89.25 |
| 5,400,888 | A * | 3/1995 | Hernandez ............ | F16D 13/583 192/89.25 |
| 5,651,621 | A * | 7/1997 | Ishimizu .................... | B41J 2/28 400/124.04 |
| 6,877,596 | B2 * | 4/2005 | Pahrisch ................ | F16D 13/583 192/111.2 |
| 7,958,978 | B2 * | 6/2011 | Snyder .................... | F16D 65/12 188/218 XL |
| 8,840,117 | B2 * | 9/2014 | Guimet ................ | F16J 15/3452 277/637 |
| 9,206,807 | B2 * | 12/2015 | Li ......................... | F04D 29/051 |
| 2004/0016278 | A1 | 1/2004 | Douman et al. | |

FOREIGN PATENT DOCUMENTS

| | | |
|---|---|---|
| JP | 55165133 U | 11/1980 |
| JP | 60222629 A | 11/1985 |
| JP | 62283221 A | 12/1987 |
| JP | H10089379 A | 4/1998 |
| JP | 2004050362 A | 2/2004 |
| JP | 5209904 B2 | 6/2013 |

OTHER PUBLICATIONS

International Search Report corresponding to Application No. PCT/JP2018/008963; dated May 15, 2018.

* cited by examiner

DISC SPRING

CROSS REFERENCE TO RELATED APPLICATIONS

This is the U.S. national stage of application No. PCT/JP2018/008963, filed on Mar. 8, 2018. Priority under 35 U.S.C. § 119(a) and 35 U.S.C. § 365(b) is claimed from Japanese Application No. 2017-044380, filed Mar. 8, 2017; the disclosures of which are incorporated herein by reference.

TECHNICAL FIELD

The present invention relates to a disc spring.

BACKGROUND

In the related art, a disc spring as shown in Patent Document 1 described below is known. The disc spring includes an annular body portion. In a case where a direction along the central axis line of the annular body portion is referred to as an axial direction, where a direction orthogonal to the central axis line in a plan view as viewed in the axial direction is referred to as a radial direction, and where a direction going around the central axis line is referred to as a circumferential direction, the disc spring of Patent Document 1 includes claw portions protruding inward in the radial direction from the inner peripheral edge of the body portion. The claw portion gradually extends toward one side in the axial direction as it goes inward in the radial direction.

In the disc spring, when a load in the axial direction acts on a portion between the body portion and the claw portion, the body portion is elastically deformed, and the tip of the claw portion moves (strokes) in the axial direction with respect to the body portion.

DOCUMENT OF RELATED ART

Patent Document

[Patent Document 1] Japanese Patent No. 5209904

SUMMARY

Technical Problem

Incidentally, in this type of disc spring, it is desired to stabilize the characteristics of load with respect to the stroke. Here, the inventor of the present invention has found that when such a disc spring is fitted on a rotary shaft and is rotated and used, the characteristics of load with respect to the stroke change according to the rotational speed.

The present invention is made in view of such circumstances, and an object thereof is to stabilize the load characteristics of the disc spring to be used in rotated.

Solution to Problem

In order to solve the above-described problems, a disc spring of an aspect of the present invention is a disc spring for being fitted on a rotary shaft, including: an annular body portion; a claw portion protruding inward in a radial direction from an inner peripheral edge of the body portion, wherein the claw portion gradually extends toward one side in an axial direction as it goes inward in the radial direction, and at least a tip part of the claw portion is provided with a hole.

In the disc spring of the above aspect, the claw portion gradually extends toward one side in the axial direction as it goes inward in the radial direction. Thereby, when the disc spring rotates, the centrifugal force acts on the claw portion and causes the claw portion to be pushed to be deformed such that the claw portion rises outward in the axial direction with the connection part between the body portion and the claw portion as a base point. The deformation (centrifugal force) acts to stronger push an object to be pushed contacting the tip of the claw portion toward the one side in the axial direction, as the rotational speed further increases. This pushing force causes the apparent load characteristics of the disc spring to be changed.

Here, in the above aspect, at least the tip part of the claw portion is provided with the hole. Thereby, the mass of the tip part of the claw portion that causes the pushing force due to the rotation as described above to increase is reduced, and thus the pushing force can be limited. Therefore, the load characteristics of the disc spring can be limited from changing according to the rotational speed, and the load characteristics can be stabilized.

In the disc spring of the above aspect, the opening area of part of the hole positioned outside of a center part of the hole in the radial direction may be less than the opening area of part of the hole positioned inside of the center part in the radial direction.

In addition, in the disc spring of the above aspect, the hole may be a long hole extending outward in the radial direction from the tip part of the claw portion, and the width in a circumferential direction of part of the long hole excluding an inner end part in the radial direction of the long hole may gradually decrease outward in the radial direction.

In this case, the mass of the tip part of the claw portion that is largely influenced by the centrifugal force according to the rotational speed is reduced, and the cross-sectional area of a root part of the claw portion that is comparatively less influenced by such centrifugal force is increased, whereby the strength of the root part can be secured.

In the disc spring of the above aspect, the opening area of part of the long hole positioned outside of a center part in the radial direction of the long hole may be less than the opening area of part of the long hole positioned inside of the center part in the radial direction.

In addition, in the disc spring of the above aspect, the cross-sectional area of the claw portion in a direction orthogonal to an extending direction in which the claw portion extends gradually increases outward in the radial direction in a range in the extending direction corresponding to part of the long hole excluding an inner end part in the radial direction of the long hole.

In this case, it is possible to easily obtain a shape in which the mass of the tip part of the claw portion is reduced and the cross-sectional area of the root part is increased.

Effects

According to the above aspect of the present invention, the load characteristics of the disc spring to be used in rotated can be stabilized.

BRIEF DESCRIPTION OF DRAWINGS

FIG. 1B is attached.

DESCRIPTION OF EMBODIMENTS

Hereinafter, an embodiment of the disc spring of the present invention will be described with reference to FIG. 1A to FIG. 4.

Figure 1A:
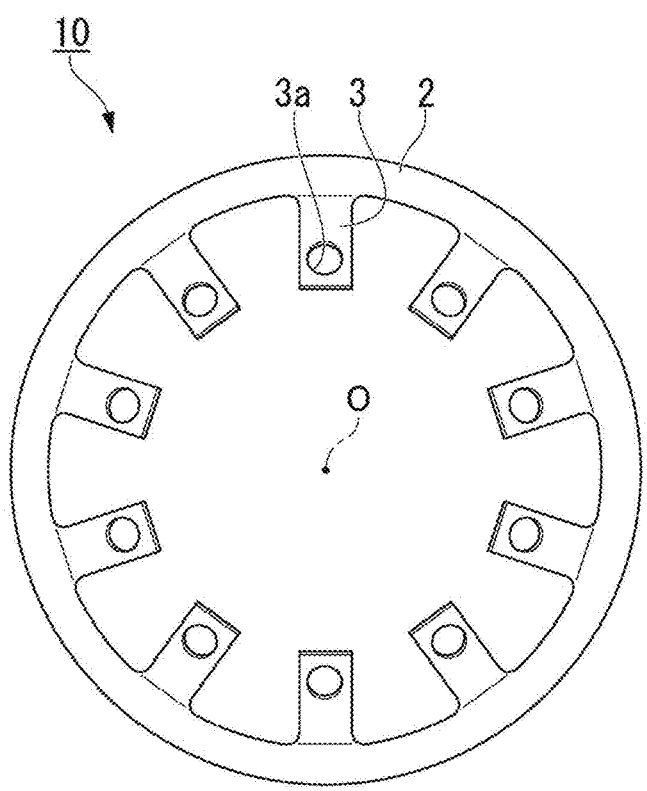
FIG. 1A and FIG. 1B is a schematic diagram of a disc spring shown as an embodiment of the present invention, FIG. 1A thereof is a plan view, and FIG. 2B thereof is a side view.
Figure 1B:
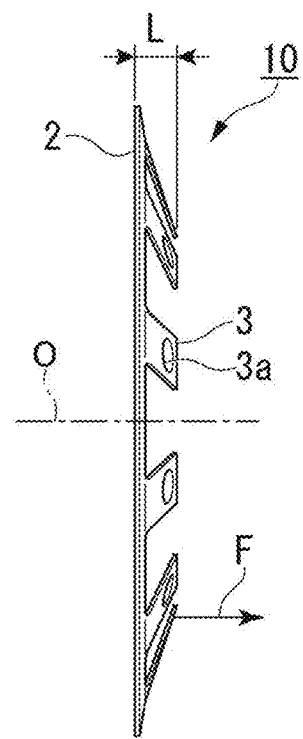

As shown in FIG. 1A and FIG. 1B, a disc spring 10 of this embodiment includes an annular body portion 2 and a plurality of claw portions 3. The disc spring 10 may be used in being fitted on a rotary shaft (not shown) so as to encircle the shaft. The disc spring 10 is formed of a plate material of elastically deformable metal or the like by using, for example, press working or the like, but the material and working method of the disc spring 10 may be appropriately changed.

In this embodiment, a direction along a central axis line O of the body portion 2 is referred to as an axial direction. In a plan view as viewed in the axial direction, a direction orthogonal to the central axis line O is referred to as a radial direction, and a direction going around the central axis line O is referred to as a circumferential direction. In addition, one of two areas between which the disc spring 10 is interposed in the axial direction may be referred to as +X side (right side FIG. 1B), and the other thereof may be referred to as −X side (left side of FIG. 1B).

FIG. 1A is a plan view of the disc spring 10 viewed in the axial direction, and FIG. 1B is a side view of the disc spring 10 viewed in the radial direction.

Each claw portion 3 protrudes inward in the radial direction from an inner peripheral edge of the body portion 2. The plurality of claw portions 3 are arranged at equal intervals in the circumferential direction. Note that the present invention is not limited to this configuration, and the claw portions 3 may be arranged such that, for example, large and small intervals are alternately provided in the circumferential direction. Each claw portion 3 gradually extends toward one side in the axial direction (+X side in FIG. 1B) as it goes inward in the radial direction. In this embodiment, the width in the circumferential direction of each claw portion 3 is equal on the entire area in an extending direction thereof (an extending direction P described later), but the present invention is not limited thereto, and for example, the width of the claw portion 3 may increase or decrease inward in the radial direction. A tip part of each claw portion 3 (an end part on an inner side thereof in the radial direction) is provided with a circular hole 3a penetrating the claw portion 3. The tip part of the claw portion 3 in this embodiment corresponds to a portion of the claw portion 3 being from a center part in the radial direction of the claw portion 3 to the tip thereof. The center part in the radial direction of the claw portion 3 corresponds to a central position between the inner end and the outer end in the radial direction of the claw portion 3. The hole 3a penetrates the claw portion 3 in a plate thickness direction (a direction orthogonal to both the width direction and the extending direction of the claw portion 3).

Next, a clutch device 30 to which the disc spring 10 is attached will be described. The configuration not shown is similar to the related art and thus is omitted hereafter.

Figure 2:
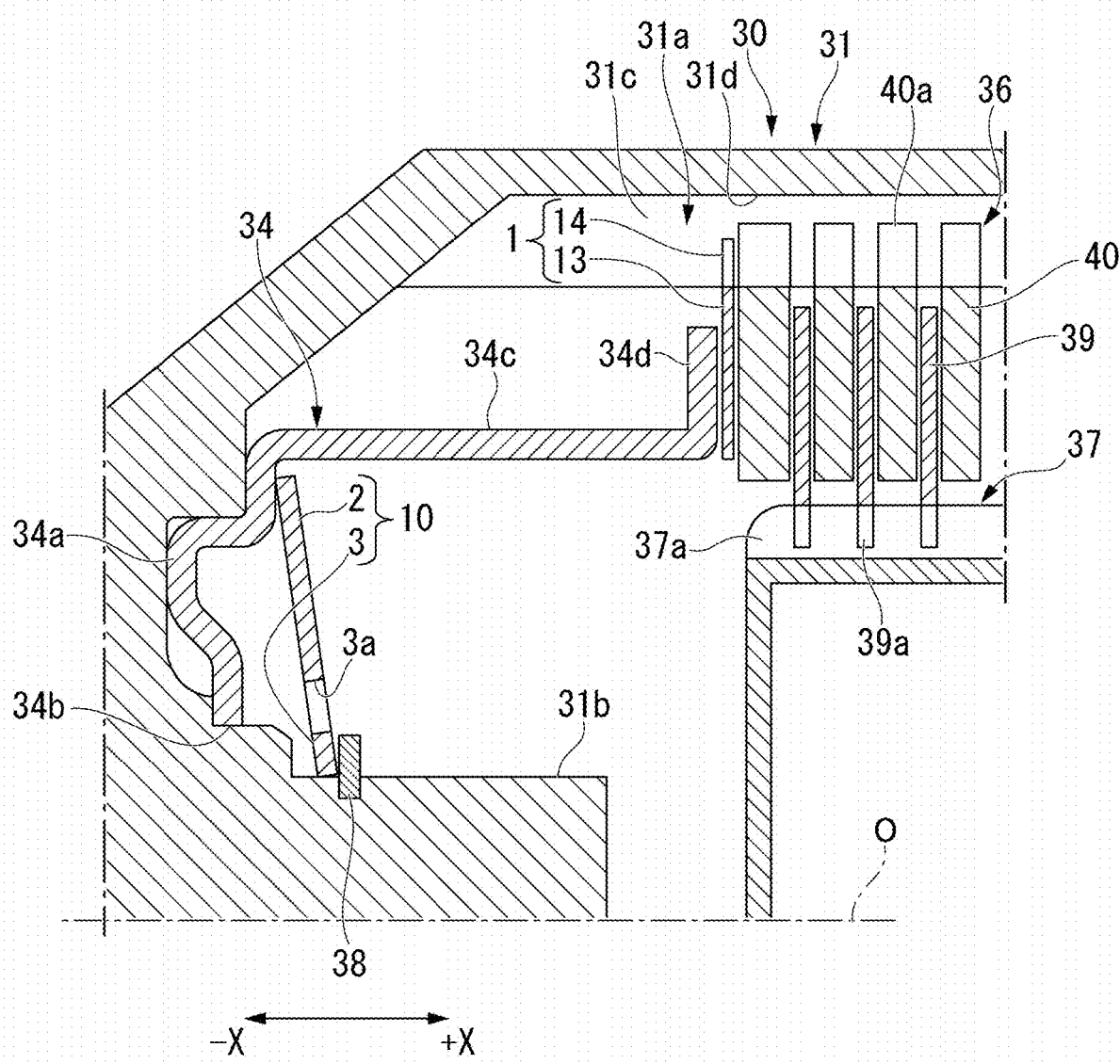
FIG. 2 is a schematic diagram of a clutch device to which the disc spring shown in FIG. 1A

As shown in FIG. 2, the clutch device 30 includes a case body (clutch drum) 31, a cylindrical piston 34, the disc spring 10, a friction mechanism 36, a wave spring 1, a clutch hub 37 and a snap ring 38. The disc spring 10 is used as a return spring of the clutch device 30.

Among these members, the members 1, 10, 34 and 36 to 38 other than the case body 31 are accommodated inside the case body 31. The piston 34, the disc spring 10, the friction mechanism 36, the clutch hub 37 and the snap ring 38 are arranged coaxially with the wave spring 1.

The case body 31 is formed of, for example, an aluminum alloy or the like.

The piston 34 is formed in a laterally extending cylindrical shape with a bottom. A bottom wall part 34a of the piston 34 is provided with a through-hole 34b positioned coaxially with the central axis line O, and a support protrusion 31b provided in the case body 31 is disposed inside the through-hole 34b. An open end part 34d of a circumferential wall part 34c of the piston 34 faces the friction mechanism 36 in the axial direction. The disc spring 10 and the snap ring 38 are arranged inside the circumferential wall part 34c of the piston 34 in this order in the axial direction from the bottom wall part 34a-side (−X side) to the open end part 34d-side (+X side).

An inner peripheral part of the snap ring 38 is fixed to an outer peripheral surface of the support protrusion 31b, and an outer peripheral part of the snap ring 38 supports the tip of the claw portion 3 (the end on an inner side thereof in the radial direction) of the disc spring 10 from the open end part 34d-side (+X side) in the axial direction. That is, the −X side surface of the snap ring 38 supports the tip of the claw portion 3 of the disc spring 10 in the axial direction.

The disc spring 10 is fitted on the support protrusion 31b so as to encircle it. An outer peripheral part of the body portion 2 of the disc spring 10 is in contact with an inner surface of the piston 34. That is, the support protrusion 31b corresponds to a rotary shaft on which the disc spring 10 is fitted so as to encircle the shaft.

The wave spring 1 includes an annular body 13 formed by alternately connecting, in the circumferential direction, convex portions that protrude toward one side in the axial direction and concave portions that protrude toward the reverse side to the one side. A restriction protrusion 14 that protrudes outward in the radial direction is disposed on an outer peripheral surface (outer peripheral edge) of the annular body 13. The wave spring 1 is disposed in a gap between the open end part 34d of the circumferential wall part 34c of the piston 34 and the friction mechanism 36 in the axial direction.

In the above configuration, when the piston 34 moves to the open end part 34d-side (+X side) in the axial direction, the piston 34 pushes and elastically deforms the disc spring 10 and the wave spring 1. Among these members, the disc spring 10 causes the piston 34 to restoratively move to −X side in the axial direction, and the wave spring 1 moderates the impact force that occurs when the piston 34 comes into contact with the friction mechanism 36.

At this time, the disc spring 10 is elastically deformed such that the length L (refer to FIG. 1B) in the axial direction from the tip of the claw portion 3 to the outer peripheral edge of the body portion 2 increases and decreases.

The friction mechanism 36 is disposed to face the open end part 34d of the piston 34 from the outside of the piston 34 in the axial direction. The friction mechanism 36 is configured in which annular follower plates 40 and annular friction plates 39 whose inner diameter and outer diameter are less than those of the follower plate 40 respectively are arranged alternately in the axial direction. The follower plates 40 and the friction plates 39 are arranged coaxially with the central axis line O. An outer restriction protrusion 40$a$ that protrudes outward in the radial direction is provided on the outer peripheral surface of the follower plate 40. An inner restriction protrusion 39$a$ that protrudes inward in the radial direction is provided on the inner peripheral surface of the friction plate 39.

The outer restriction protrusion 40$a$ of the follower plate 40 and the restriction protrusion 14 of the wave spring 1 are engaged with a recessed part 31$a$ formed on an inner surface of the case body 31.

The recessed part 31$a$ is formed in a groove shape, which extends in the axial direction and opens inward in the radial direction. The recessed part 31$a$ has a rectangular shape when viewed in the axial direction, and two sides of the four sides of the recessed part 31$a$ extend substantially in the radial direction. Three inner surfaces 31$c$ and 31$d$ that form the recessed part 31$a$ extend straight in the axial direction. Among the inner surfaces 31$c$ and 31$d$ that form the recessed part 31$a$, a pair of facing surfaces 31$c$ that are opposite to each other in the circumferential direction face circumferential end surfaces (a pair of end surfaces in the circumferential direction) of the restriction protrusion 14 in the circumferential direction. The inner surface 31$d$ faces inward in the radial direction.

The clutch hub 37 is arranged at the inside in the radial direction of the friction mechanism 36. The outer peripheral surface of the clutch hub 37 is provided with an engagement recess 37$a$ with which the inner restriction protrusion 39$a$ of the friction plate 39 engages.

(Function)

Incidentally, in this type of clutch device 30, the disc spring 10 may be rotated on the central axis line O. Here, as described above, the claw portion 3 of the disc spring 10 gradually extends toward one side (+X side) in the axial direction as it goes inward in the radial direction. Thereby, when the disc spring 10 rotates on the central axis line O, a centrifugal force acts on the claw portion 3 and causes the claw portion 3 to be pushed to be deformed such that the claw portion 3 rises outward in the axial direction with the connection part (hereinafter, simply referred to as a root part) between the body portion 2 and the claw portion 3 as a base point. This deformation (centrifugal force) acts as a pushing force F (refer to FIG. 1B) that pushes the snap ring 38, which is in contact with the tip of the claw portion 3, toward the one side (+X side) in the axial direction. Therefore, the resultant of a primary elastic restoring force due to the elastic deformation of the body portion 2 and the claw portion 3 and the pushing force F is applied to the snap ring 38 and the piston 34, and thus the apparent load characteristics of the disc spring 10 change.

Further, since the pushing force F is caused by the centrifugal force, as the rotational speed increases, the pushing force F also increases. That is, as the rotational speed at which the disc spring 10 rotates on the central axis line O increases, the apparent load of the disc spring 10 increases, and thus there is a possibility that the load characteristics of the disc spring 10 become unstable.

Therefore, in the disc spring 10 of this embodiment, as described above, the tip part of the claw portion 3 is provided with the hole 3$a$. Thereby, the mass of the tip part of the claw portion 3 that causes the pushing force F due to the rotation as described above can be reduced, and the pushing force F can be limited to be small. Therefore, the load characteristics of the disc spring can be limited from changing according to the rotational speed and can be stabilized.

Further, since the hole 3$a$ is formed at the tip of the claw portion 3, the cross-sectional area of the root part of the claw portion 3 is not reduced, and thus the strength of the root part can be secured.

(Study of Load Characteristics)

Next, the results of studying the effect of the presence or absence of rotation, the presence or absence of the hole 3$a$ in the claw portion 3 and the shape of the hole 3$a$ on the load characteristics of the disc spring 10 will be described with reference to FIG. 4. In this study, three types of disc springs shown in FIG. 1A and FIG. 1B, FIG. 3A and FIG. 3B and FIG. 5 are used and are referred to as a practical example 1, a practical example 2 and a comparative example, respectively. The above three types of disc springs have equal basic specifications such as the thicknesses and external shapes of the body portion 2 and the claw portion 3, but are different only in the configuration of the hole 3$a$.

Specifically, in the disc spring 10 of the practical example 1 shown in FIG. 1A and FIG. 1B, a circular hole 3$a$ is provided in the tip part of the claw portion 3.

Figure 3A:
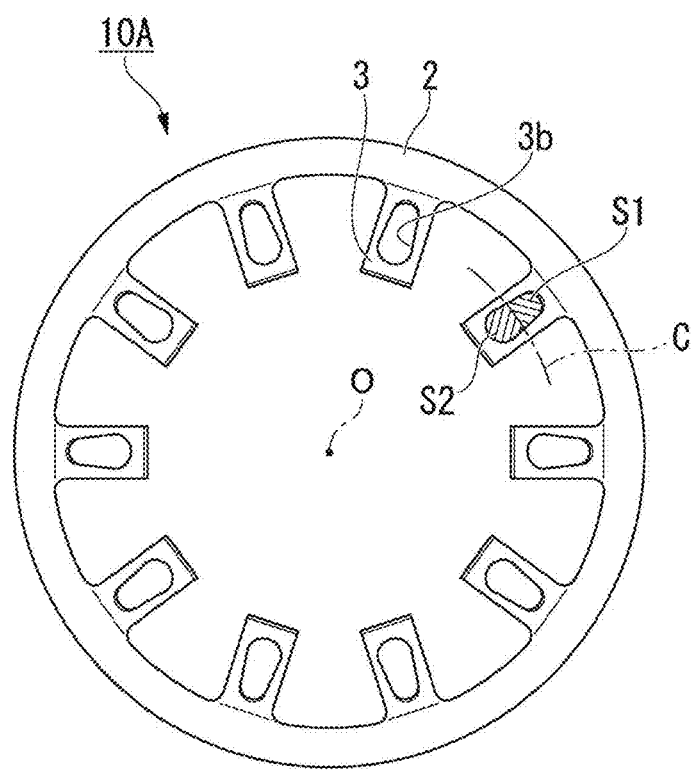
FIG. 3A and FIG. 3B is a schematic diagram of a disc spring of a practical example 2, FIG. A thereof is a plan view, and FIG. 3B thereof is a side view.
Figure 3B:
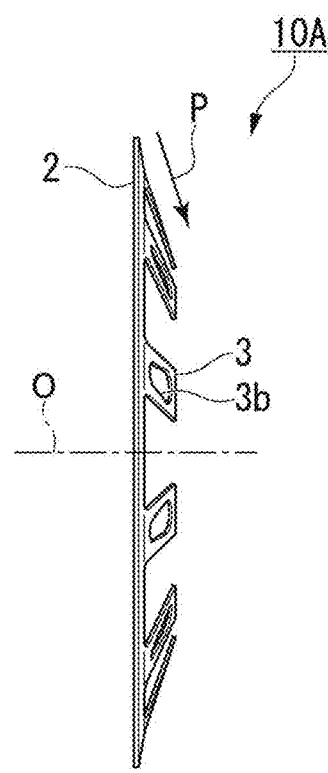

In a disc spring 10A of the practical example 2 shown in FIG. 3A and FIG. 3B, the claw portion 3 is provided with a long hole 3$b$ that extends outward in the radial direction from the tip part of the claw portion 3. The long hole 3$b$ extends from the tip part to the root part of the claw portion 3. A curved surface that is convex inward in the radial direction is formed at the end part on an inner side in the radial direction of the long hole 3$b$. The part of the long hole 3$b$ including the curved surface (for example, an arc) that is convex inward in the radial direction is referred to as a radially inner end part. In the practical example 2, the length in the radial direction of the radially inner end part of the long hole 3$b$ is less than the length in the radial direction of part of the long hole 3$b$ excluding the radially inner end part. In addition, a curved surface that is convex outward in the radial direction is formed at the end part on an outer side in the radial direction of the long hole 3$b$. The radius of curvature at the end part (the radially inner end part) on an inner side in the radial direction of the long hole 3$b$ is equal to the radius of the hole 3$a$ in the practical example 1. The width in the circumferential direction of part of the long hole 3$b$ excluding the radially inner end part gradually decreases outward in the radial direction. Thereby, in a cross-sectional view orthogonal to the extending direction P in which the claw portion 3 extends (refer to FIG. 3B), the cross-sectional area of the claw portion 3 adjacent in the circumferential direction to part of the long hole 3$b$ excluding the radially inner end part gradually increases outward in the radial direction. In other words, the cross-sectional area of the claw portion 3 in a direction orthogonal to the extending direction P in which the claw portion 3 extends gradually increases outward in the radial direction in a range in the extending direction P corresponding to part of the long hole 3$b$ excluding the radially inner end part. In addition, the mass of part of the claw portion 3 positioned outside of a center part in the radial direction of the claw portion 3 is greater than the mass of part of the claw portion 3 positioned inside of the center part in the radial direction. Note that the extending direction P is a direction in which the claw portion 3 extends from the root part to the tip part in a side view as viewed in a direction orthogonal to the central axis line O.

FIG. 3A is a plan view of the disc spring 10A viewed in the axial direction, and FIG. 3B is a side view of the disc spring 10A viewed in the radial direction.

A virtual line C shown in FIG. 3A is an arc centering on the central axis line O and passing through the center in the radial direction of the long hole 3b. If the opening area of part of the long hole 3b outside of the virtual line C in the radial direction is represented by S1, and the opening area of part of the long hole 3b inside of the virtual line C in the radial direction is represented by S2, they are set to be S1≤S2. That is, the opening area S1 of part of the long hole 3b positioned outside of the center part thereof in the radial direction is less than the opening area S2 of part of the long hole 3b positioned inside of the center part in the radial direction.

Figure 5:
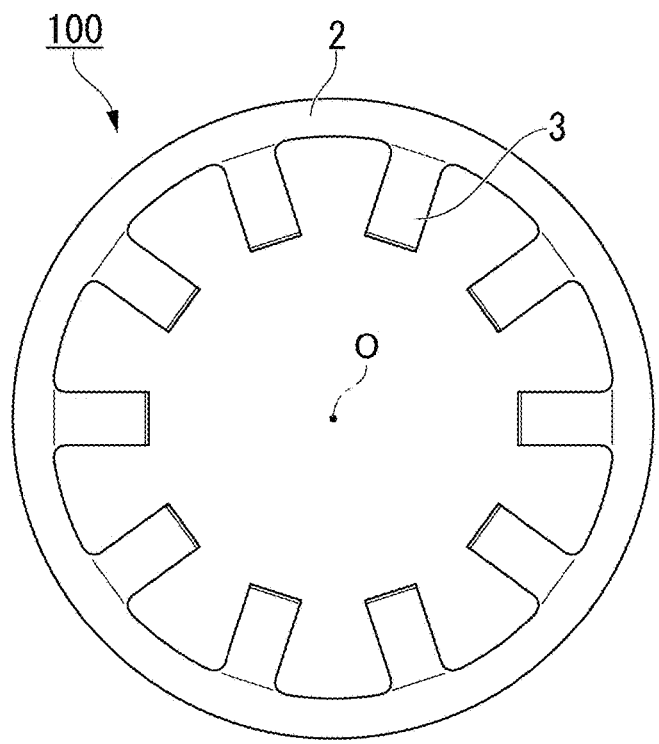
FIG. 5 is a plan view of a disc spring of a comparative example.

In a disc spring 100 of the comparative example shown in FIG. 5, the claw portion 3 is provided with no hole. FIG. 5 is a plan view of the disc spring 100 viewed in the axial direction.

Figure 4:
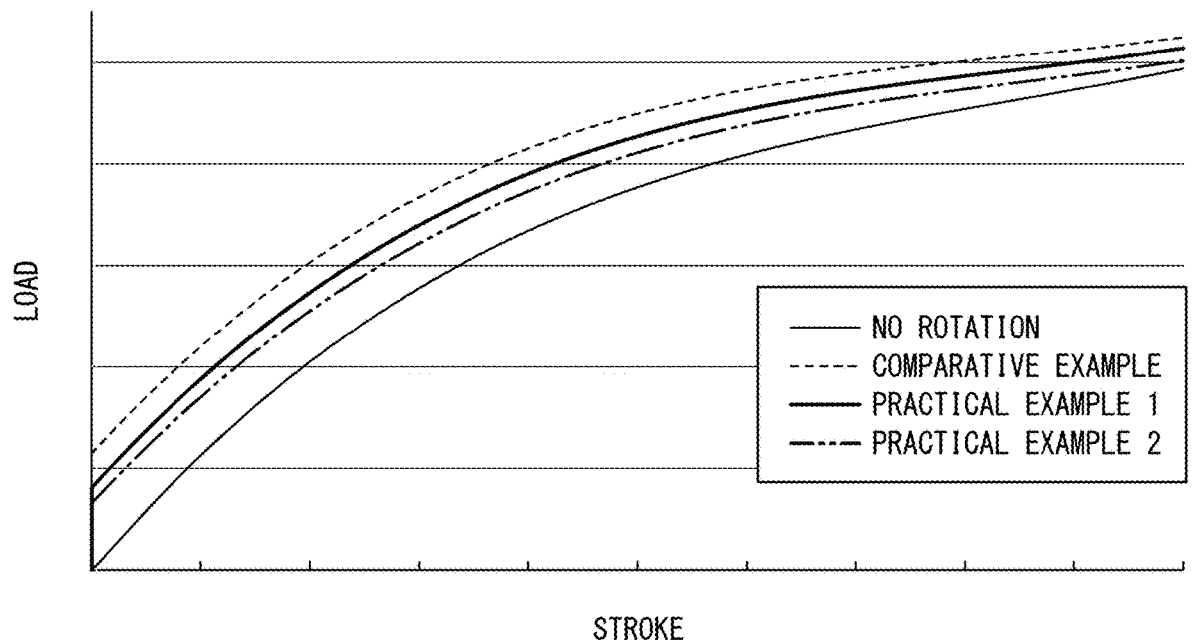
FIG. 4 is a graph showing the relationship between the stroke of the disc spring and the load.

Here, in the graphs shown in FIG. 4, "no rotation" denotes data when the disc spring 100 of the comparative example shown in FIG. 5 is used without rotating on the central axis line O. In addition, in the graphs shown in FIG. 4, "comparative example", "practical example 1" and "practical example 2" denote data when each disc spring of the comparative example and the practical examples 1 and 2 is rotated on the central axis line O at 5000 rpm.

The horizontal axis shown in FIG. 4 indicates a stroke amount of the disc spring. Here, the stroke amount denotes the compression deformation amount of the length L in the axial direction of the disc spring with reference to no load. That is, when the disc spring is not compressed and deformed in the axial direction, the stroke amount is zero. The vertical axis shown in FIG. 4 indicates an apparent load in the axial direction due to the disc spring. The apparent load is the sum of the elastic restoring force of the body portion 2 and the pushing force F described above.

Here, both graphs of "no rotation" and "comparative example" in FIG. 4 denote data regarding the disc spring 100 of the comparative example, and the difference in conditions is whether or not the disc spring 100 is rotated. That is, the difference between the graph of "comparative example" and the graph of "no rotation" indicates an increase in the apparent load of the disc spring 100 due to the rotation of the disc spring 100. That means that the further the value of load deviates from the date of "no rotation", the greater the pushing force F due to the rotation of the disc spring 100 acts.

As is clear from FIG. 4, both graphs of the practical examples 1 and 2 are closer to the graph of "no rotation" than the graph of "comparative example". That is, the difference between each graph of the practical examples 1 and 2 and the graph of "no rotation" is less than the difference between the graph of "comparative example" and the graph of "no rotation". This is because in the practical examples 1 and 2, the claw portion 3 is provided with the hole 3a or the long hole 3b and the claw portion 3 is reduced in weight so that the centrifugal force acting on the claw portion 3 is reduced and the pushing force F is reduced. In this way, by forming the hole 3a or the long hole 3b in the claw portion 3, the load characteristics can be limited from becoming unstable when the disc spring is rotated on the central axis line O.

In addition, the graph of the practical example 2 is closer to the graph of "no rotation" than the graph of the practical example 1. That is, the difference between the graph of the practical example 2 and the graph of "no rotation" is less than the difference between the graph of the practical example 1 and the graph of "no rotation".

This is because the opening area of the long hole 3b of the practical example 2 is greater than that of the hole 3a of the practical example 1 so that the mass of the claw portion 3 of the former is less than that of the latter.

Further, as shown in the practical example 2, the cross-sectional area of the claw portion 3 in a cross section orthogonal to the extending direction P is set to gradually increase outward in the radial direction, whereby the mass of the tip part of the claw portion 3 that generates a large pushing force F according to the rotational speed is reduced, and the cross-sectional area of the root part of the claw portion 3 that generates a comparatively small pushing force F is increased, and thus the strength of the root part can be secured.

Although detailed numerical values are omitted in the drawings, in an example of the study results, when the stroke is 2 mm, the pushing force F that was generated in the disc spring 100 of the comparative example could be reduced by about 34% by the disc spring 10 of the practical example 1 and could be reduced by about 56% by the disc spring 10A of the practical example 2.

Note that the technical scope of the present invention is not limited to the above-described embodiment, and various modifications can be added within the scope of the present invention.

For example, in the above embodiment, the disc spring 10 (10A) to be used for the clutch device 30 has been described, but the disc spring 10 (10A) may be used for other devices.

Further, the shapes of the body portion 2, the claw portion 3, the hole 3a and the long hole 3b shown in the practical examples 1 and 2 are examples and can be appropriately changed. For example, the number of the claw portions 3 protruding from the body portion 2, the width in the circumferential direction of the claw portion 3, the length in the extending direction P of the claw portion 3 and the like may be appropriately changed.

The configurations of the hole 3a and the long hole 3b shown in the practical examples 1 and 2 are examples and can be appropriately changed. For example, by forming a plurality of fine holes in the tip part of the claw portion 3, the mass of the tip part may be reduced. Moreover, such a plurality of fine holes may be formed on the entire area of the claw portion 3, and the density of the arranged fine holes may be greater in the tip-side of the radially center part of the claw portion 3 than that in the root part-side of the radially center part thereof. That is, it is sufficient that at least the tip part of the claw portion 3 is provided with a hole.

The opening shape of the long hole 3b may be a polygonal shape, a rectangular shape, a trapezoidal shape, or the like. The width in the circumferential direction of the radially inner end part of the long hole 3b may gradually decrease inward in the radial direction, or may gradually increase inward in the radial direction. The long hole 3b may not be provided with the radially inner end part including a curved surface convex inward in the radial direction.

The external shape of the claw portion 3 shown in the practical examples 1 and 2 is an example and can be appropriately changed. For example, the claw portion 3 having an external shape such as a trapezoid, an inverted trapezoid, a hammer shape or the like may be adopted.

Moreover, it is possible to appropriately replace the constituent elements of the above-described embodiments with well-known constituent elements within the scope of the present invention, and the above-described embodiments and modifications may be appropriately combined.

DESCRIPTION OF REFERENCE SIGNS 2 body portion
3 claw portion

3*a* hole
3*b* long hole
10, 10A disc spring
O central axis line

What is claimed is:

1. A disc spring for being fitted on a rotary shaft and to be used in rotated, the disc spring comprising:
   an annular body portion;
   a claw portion protruding inward in a radial direction from an inner peripheral edge of the body portion, wherein
   the claw portion gradually extends toward one side in an axial direction as it goes inward in the radial direction, and
   at least a tip part of the claw portion is provided with a hole, and the hole is formed such that the hole does not reach a root part of the claw portion, the root part being a connection part between the body portion and the claw portion,
   wherein an opening area of an outside part of the hole is less than an opening area of an inside part of the hole, the outside part being a part positioned outside of a virtual line in the radial direction, the inside part being a part positioned inside of the virtual line in the radial direction, the virtual line being an arc centering on a central axis line of the body portion and passing through a center in the radial direction of the hole.

2. The disc spring according to claim 1, wherein the hole is a long hole extending outward in the radial direction from the tip part of the claw portion, and
   a width in a circumferential direction of part of the long hole excluding an inner end part in the radial direction of the long hole gradually decreases outward in the radial direction.

3. The disc spring according to claim 2, wherein
   a cross-sectional area of the claw portion in a direction orthogonal to an extending direction in which the claw portion extends gradually increases outward in the radial direction in a range in the extending direction corresponding to part of the long hole excluding an inner end part in the radial direction of the long hole.

4. The disc spring according to claim 1, wherein the hole is a long hole extending outward in the radial direction from the tip part of the claw portion, and
   a cross-sectional area of the claw portion in a direction orthogonal to an extending direction in which the claw portion extends gradually increases outward in the radial direction in a range in the extending direction corresponding to part of the long hole excluding an inner end part in the radial direction of the long hole.

* * * * *